United States Patent [19]

Kishida

[11] Patent Number: 4,663,712
[45] Date of Patent: May 5, 1987

[54] METHOD AND APPARATUS FOR REAPING LEVEL CONTROL

[75] Inventor: Hiroshi Kishida, Kishiwada, Japan

[73] Assignee: Kubota, Ltd., Osaka, Japan

[21] Appl. No.: 582,686

[22] Filed: Feb. 23, 1984

[30] Foreign Application Priority Data

Dec. 19, 1983 [JP] Japan .................................. 58-239431

[51] Int. Cl.[4] ...................... G06F 15/20; A01D 75/28
[52] U.S. Cl. .................................... 364/424; 56/10.2;
  56/DIG. 15; 364/575
[58] Field of Search .............. 364/424, 550, 551, 552,
  364/507, 561, 562, 575, 565; 371/25, 28;
  56/10.2, DIG. 15, 15.1, 15.2, 17.1

[56] References Cited

U.S. PATENT DOCUMENTS

| | | | |
|---|---|---|---|
| 3,665,399 | 5/1972 | Zehr et al. | 364/551 |
| 3,771,167 | 11/1973 | Ross | 364/575 |
| 3,819,916 | 6/1974 | Watanabe | 364/507 |
| 3,936,663 | 2/1976 | Taylor et al. | 364/551 |
| 4,281,388 | 7/1981 | Friend et al. | 364/565 |
| 4,366,544 | 12/1982 | Shima et al. | 364/550 |
| 4,414,792 | 11/1983 | Bettencourt et al. | 56/DIG. 15 |
| 4,437,295 | 3/1984 | Rock | 56/10.2 |
| 4,490,800 | 12/1984 | Powers | 364/575 |
| 4,507,910 | 4/1985 | Thornley et al. | 56/10.2 |
| 4,530,045 | 7/1985 | Petroff | 364/575 |

Primary Examiner—Gary Chin
Attorney, Agent, or Firm—Edwin E. Greigg

[57] ABSTRACT

A method of controlling reaping level comprising the steps of averaging the lengths measured by a noncontact distance sensor, comparing the preset target data with the measured and averaged data, computing the difference therebetween and raising or lowering a reaping section in accordance with the amount of the difference. When averaging the measured data, abnormal data which cause erroneous functions may be omitted prior to averaging.

2 Claims, 7 Drawing Figures

| | |
|---|---|
| A1 | F3 F2 F1 F0 |
| A2 | Ha |
| A3 | Hn |
| A4 | Hn-1 |
| A5 | Hn-2 |
| A6 | Hn-3 |
| A7 | Hn-4 |
| A8 | Hn-5 |
| A9 | Hn-6 |
| A10 | ΔH |
| A11 | TARGET LEVEL |
| A12 | DEVIATION |
| A13 | |
| A14 | H1 |
| A15 | |
| A16 | SENSING ERROR COUNTER |
| A17 | REVOLUTION OF ENGINE |
| A18 | TIME OF REFERENCE TIME |
| A19 | TABLE |

| DEVIATION (mm) | ON TIME (ms) | |
|---|---|---|
| 0 ~ 20.4 | 0 | INSENSITIVE RANGE |
| 20.5 ~ 32.6 | 10 | |
| 32.7 ~ 49.0 | 20 | |
| ~ 16.32 | 90 | |
| 16.32 ABOVE | 100 | |
| 261 ABOVE | ON CONTINUOUSLY | |

— DUTY RATIO OF ON AND OFF OF VALVE

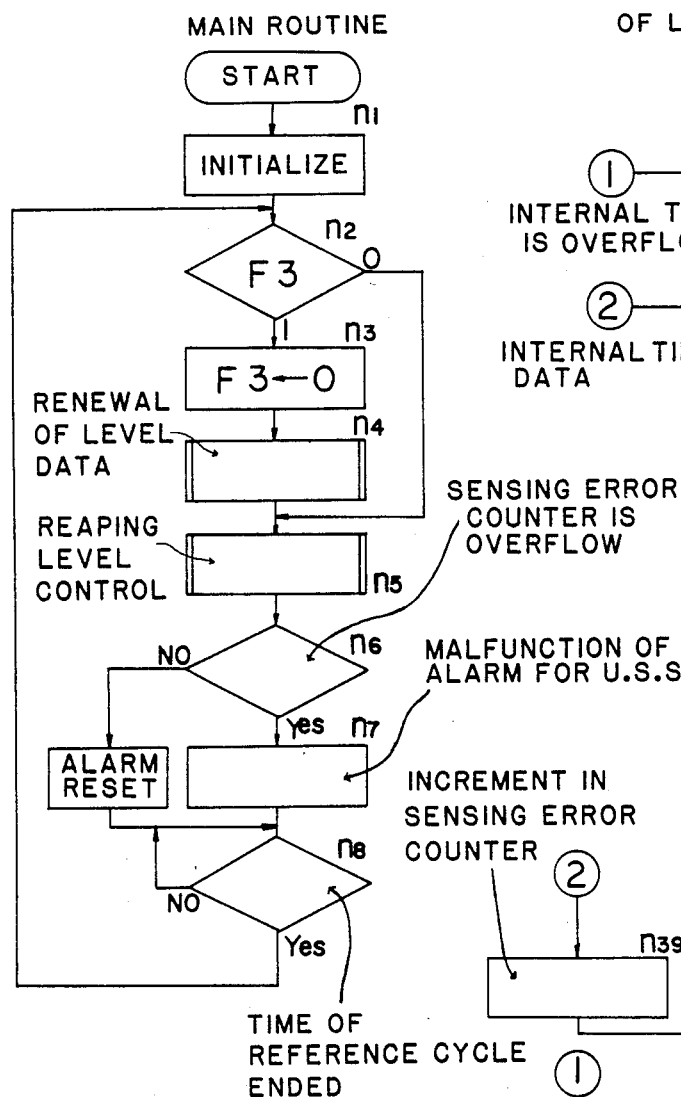
Fig. 4 (A) MAIN ROUTINE
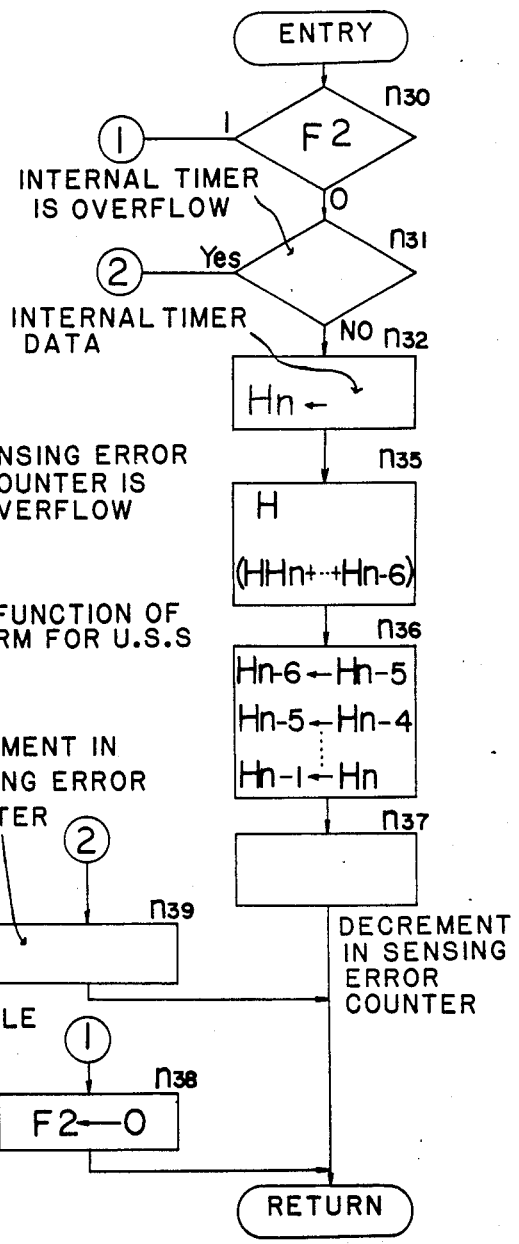
Fig. 4 (C) SUBROUTINE OF RENEWAL OF LEVEL DATA

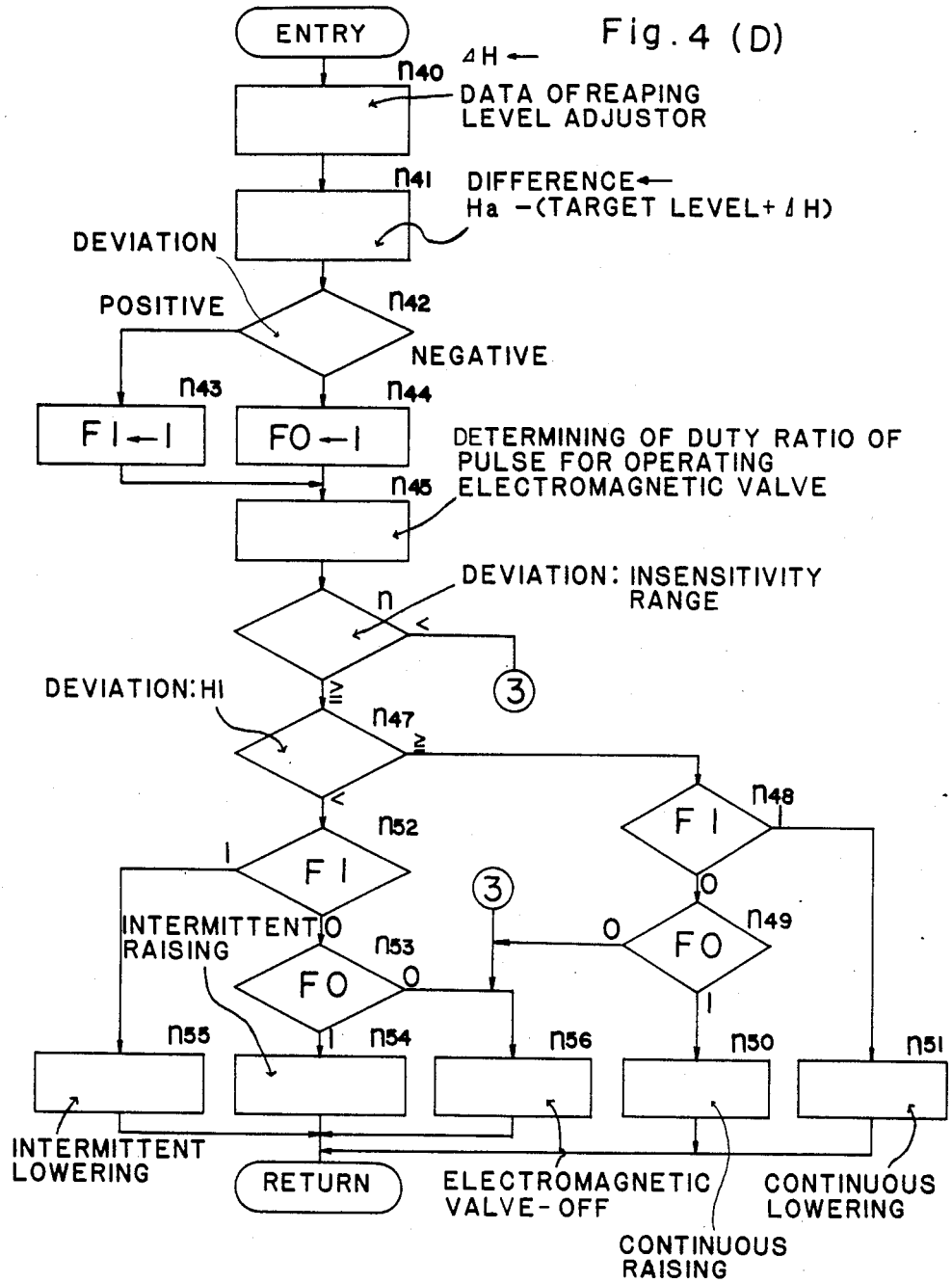

METHOD AND APPARATUS FOR REAPING LEVEL CONTROL

BACKGROUND OF THE INVENTION (1) Field of the Invention

This invention relates to a method of and apparatus for controlling reaping levels by utilizing a noncontact distance sensor. More particularly, the invention relates to a method of and apparatus for controlling reaping levels comprising the steps of deriving an average level from a certain number of level measurement data based on outputs of a noncontact distance sensor worked in fixed cycles, the data being memorized in order to measurement, deriving a difference between the average level and a predetermined target level for said measurement data, and providing a drive pulse signal having a length corresponding to the amount of the difference therebetween, which signal drives an actuator for vertically moving a reaper.

(2) Description of the Prior Art

Generally the distance sensor used to automatically control reaping levels comprises a contact type distance sensor utilizing an actuator adapted to contact the earth or a noncontact type distance sensor such as a ultrasonic wave distance sensor having an ultrasonic wave transmitter and an ultrasonic wave receiver. The contact type distance sensor, however, has a disadvantage that the actuator could be damaged when, for example, the machine body suddenly inclines by a great degree. Therefore, from the point of view of reliability, stability and so on the noncontact type distance sensor such as the ultrasonic wave sensor is increasingly favored.

In a known method of controlling reaping levels utilizing the noncontact distance sensor, levels measured in a certain cycle are compared with a predetermined reference level and a reaping implement is moved up and down at a certain speed according to the difference therebetween. However, where there are footprints or stubbles, for example, the use of measurement data per se for comparison with the reference level causes an abrupt rise or fall of the reaping implement which results in instability in the vicinity of a target level. In order to eliminate such a disadvantage the reaping implement may be vertically controlled on the basis of an average of data derived from a series of measurements.

However, if a large number of data is averaged, there occurs a great difference between actual distances and an averaged distance. This is liable to cause overshooting to occur when the reaping implement is rapidly moved in a vertical direction. If a small number of data is averaged, minor irregularities on the earth tend to unduly influence detrimentally reaper stability in the vicinity of the target level.

Furthermore, the noncontact distance sensor such as the ultrasonic wave sensor, by nature, becomes incapable of accurate measurement even if the sensor per se is in good working order, as a result of an echo attenuation which occurs when, for example, an ultrasonic wave is transmitted to soft straw lying on the earth or when a divider cuts into a stubble and the wave is transmitted into the stubble. Consequently, wrong data cause a gross error in the average level derived from the measurement data, making it impossible for the reaping implement to follow the target level.

SUMMARY OF THE INVENTION

This invention has been made having regard to the above state of the art. The object of the invention is to provide a method of controlling reaping levels in which minor irregularities are not followed when the reaper lies adjacent a target level, the reaper is brought to the target level speedily and without an overshoot when the reaper lies remote from the target level, and means is provided to automatically remove wrong measurement data in order to avoid reaper control errors.

In order to achieve the above object, a method of and apparatus for controlling reaping levels utilizing a noncontact distance sensor is provided in which, in obtaining an average of the level measurement data, those of the data which exceed a predetermined reference value are disregarded as invalid and a value of an invalid data counter which counts the frequency of continuous occurrence of invalid data is incremented whereas the invalid data counter value is decremented when the level measurement data are below the reference value. Further an alarm is given of malfunction of the noncontact distance sensor when the value of the invalid data counter reaches a predetermined numerical value, and the actuator is continuously driven irrespective of the data when the level measurement data are below the reference value and the average thereof is above a certain predetermined value.

The above characterizing features produce an excellent effect as follows:

Those of the level measurement data which exceed a predetermined reference value are disregarded as invalid and the value of an invalid data counter for counting frequency of continuous occurrence of invalid data is incremented whereas the counter value is decremented when the level measurement data are below the reference value, and an alarm is given of malfunction of the noncontact distance sensor when the invalid data counter reaches a predetermined numerical value, the alarm being lifted when the counter value falls below the predetermined numerical value. Thus, with the invalid data being discarded in advance, the level measurement data based on outputs of the noncontact distance sensor worked in fixed cycles are stored in a certain number, $n(n>2)$, cycle by cycle, and in order of measurement. The average of the level measurement data is compared with a predetermined target level, and the actuator for vertically moving the reaper is continuously driven irrespective of the average level when the average level deviates from the target level beyond a certain predetermined value.

To be more particular, the measured values are averaged after automatically discarding wrong data which would cause an operational error, and the actuator for vertically moving the reaper is driven continuously when the average of the measured value differs widely from the target level whereas the actuator is provided with a drive pulse having a length corresponding to the value of the average level data when the latter differs only slightly from the target level. Thus, the reaper is raised or lowered quickly when the actual level of the reaper greatly deviates from the target level and is raised or lowered slowly when the deviation is small. It is now possible for the reaper to be moved to the target level within a short time, without involving an overshoot.

According to the invention, therefore, any wrong data caused by the presence on the earth of straw, stubbles or the like are treated as invalid thereby preventing erroneous movements of the reaper. Also, reaping level controls are effected very stably in the vicinity of the target level. The reaper is caused to descend speedily and stop adjacent the target level at the beginning of a reaping operation or when the machine body inclines by a great degree. The reaper does not rise suddenly when, for example, a stubble is temporarily divided. Besides, there occurs no overshoot when starting a reaping operation or the machine body inclines by a great degree and the reaper descends speedily and stops at the target level.

A further advantage of this invention resides in the function of the sensor being checked with increased reliability. This is made possible by the arrangement that an alarm is given of malfunction of the sensor only when abnormal data occur continuously a certain number of times; therefore, such an alarm is limited to an occasion of sensor malfunction permitting little or no doubt as to why it has occurred.

DETAILED DESCRIPTION OF THE PREFERRED EMBODIMENT

Figure 1:
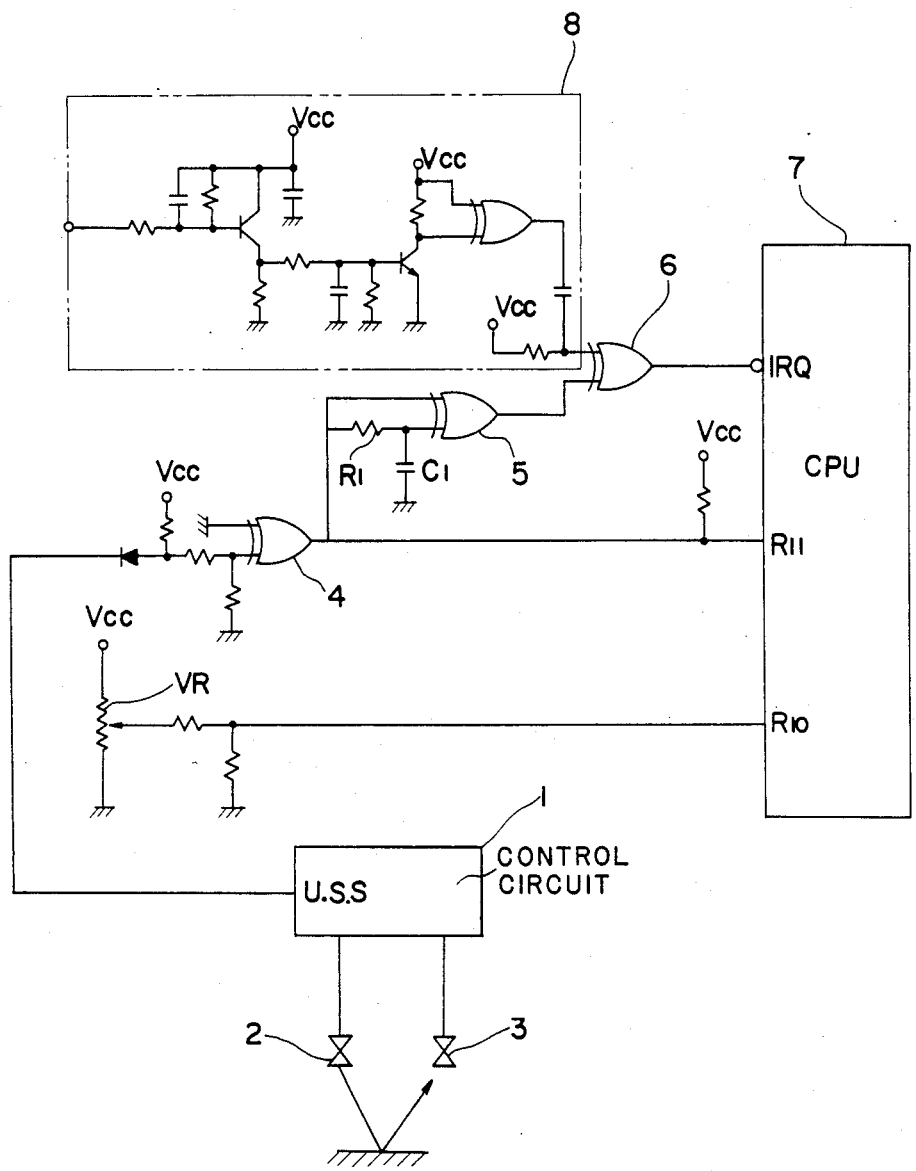
FIG. 1 is a block diagram showing a reaping level control system used with a method according to this invention.

Referring to FIG. 1, an ultrasonic wave sensor control circuit 1 energizes a wave signal transmitter 2 to send out a signal burst every 60 milliseconds. A receiver 3 receives an echo thereof and sends a reception signal to the control circuit 1. This reception signal is a negative pulse having a length corresponding to a lapse of time from the transmission of the wave to the reception of its echo, that is to say a length corresponding to the level of a reaper. If no signal has been received upon lapse of a certain time, i.e. 14 milliseconds, after the transmission of the signal, the sensor control circuit 1 forces the pulse to rise. The reception signal is subjected to waveform shaping and is then led as a reception pulse to an exclusive OR gate 4 having another, grounded input terminal. An output of this exclusive OR gate 4 is converted into a differentiated pulse by a differentiator circuit comprising an exclusive OR gate 5, a resistance R1 and a condenser C1, and is led through an exclusive OR gate 6 to an interrupt port IRQ of a central processing unit (CPU) 7. The output of the exclusive OR gate 4 is led also to an input port R11 of the CPU 7 to be used as a signal for determining whether or not an interrupt pulse entering the port IRQ is due to the sensor control circuit 1. The exclusive OR gate 6 has an input terminal connected to a waveform shaping circuit 8 for effecting waveform shaping on a signal from a dynamo as well as an input terminal connected to an output terminal of the exclusive OR gate 5. The CPU 7 measures engine revolutions by means of an interrupt signal from the waveform shaping circuit 8.

The CPU 7 has a port R10 connected to an output terminal of a reaping level fine adjustor VR. The CPU 7 includes an A/D converter to convert analog data sent from the reaping level fine adjustor into digital values to obtain data for controlling reaping levels.

Figures 2, 3:
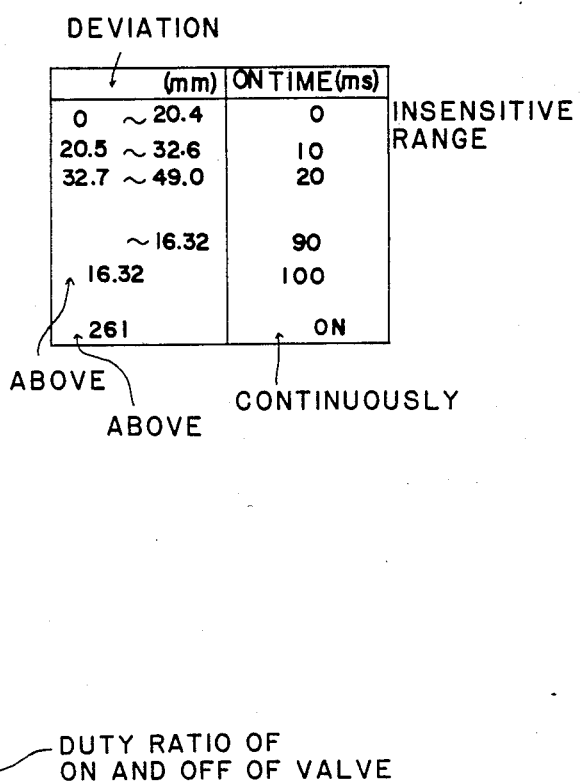
FIG. 2 is a view showing an arrangement of RAM used in the control system of FIG. 1.
FIG. 3 is a table, the contents of which are stored in the RAM.

The CPU 7 is provided with a ROM for storing a reaping level control program, and a RAM for storing the predetermined value and data and having varied flags and working areas. FIG. 2 shows an arrangement of the RAM. Address A1 includes values of four flags stored therein. Flag F0 represents a reaper raising flag, flag F1 represents a reaper lowering flag, flag F2 represents a data omitting flag serving to discard measurement data where the input pulse at the port R10 rises or trails at a time of counting engine revolutions, and flag F3 represents a level data renewal flag. Address A2 stores an average of measured data levels, that is to say an average level data derived from levels that have been measured. The average level data is worked out from a total of eight data consisting of an average level obtained in a previous cycle and seven levels subsequently measured. Address A3 stores the average level obtained in the previous cycle. Address A4 stores an average level in the cycle before last. Similarly, Addresses A5–A9 store average levels in the preceding cycles, respectively, in five successive steps from new to old. Address A10 stores a fine adjustment level data set by the reaping level fine adjustor VR. Address A11 stores a predetermined target level data. Address A12 stores a differential or deviation between the average level data at address A2 and a sum of the target level data at Address A11 and the fine adjustment level data at Address A10. Address A13 is out of use. Address A14 stores a reference level H1 for determining on the basis of the calculated average level data whether an intermittent pulse or a continuous pulse is to be given to an electromagnetic valve to vertically move the reaper. A continuous pulse is given in the case that the average level data Ha exceeds the reference level H1, and otherwise an intermittent pulse is given. Address A15 stores an on/off duty ratio for the electromagnetic valve or actuator on the basis of a table stored at Area A19 which predetermines a drive pulse transmission time corresponding to the deviation stored at Address A12. As shown in FIG. 3, when the deviation is 260 millimeters or less, an intermittent pulse is given which has a transmission time corresponding to the extent of the deviation. Its off time is set to a fixed value of 150 milliseconds. Thus, when the deviation is 21 millimeters, for example, the duty ratio is 1/16. Address 16 constitutes a sensing error counter to be described later. This counter is a hexadecimal up down counter which, although the sensor is in good order, is incremented when no signal is received even upon lapse of a predetermined time (6 milliseconds) after the signal transmission, and is decremented when the signal is received within the predetermined time. Address A17 stores the number of engine revolutions calculated by means of interrupts from the dynamo. Address A18 stores a unit of 10 milliseconds which is the time for a standard cycle for reaping level controls. Address A19, as already described, stores the table of relationships between the deviation and the drive pulse transmission time (FIG. 3).

An operation of the reaping level control system as arranged above is described hereinafter with reference to the flowcharts of FIGS. 4(A)–4(D).

Figure 4:
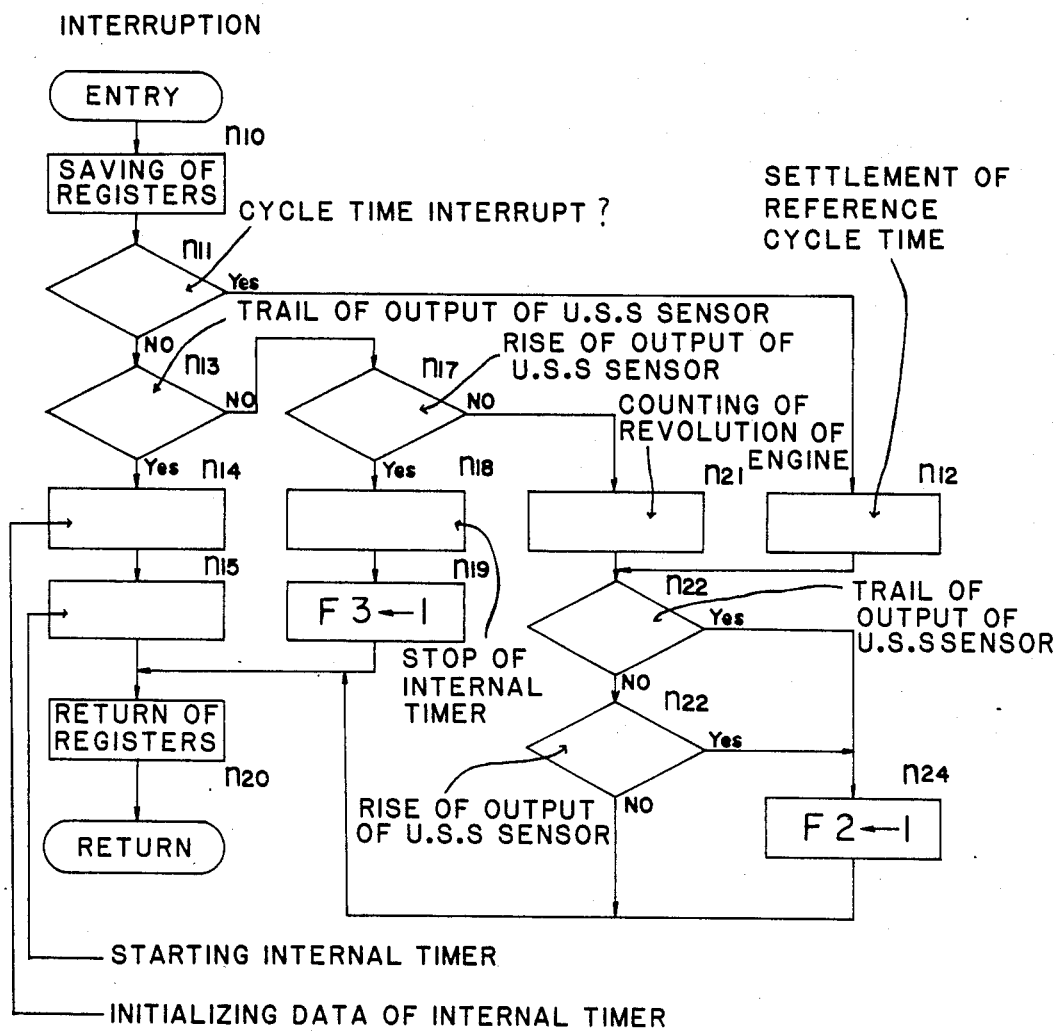
FIGS. 4(A) through 4(D) are flowcharts each showing a operational mode of the control system.

FIG. 4(A) is a flowchart depicting a main routine for controlling reaping levels. At step n1 varied registers and flags are initialized. Step n2 is for checking on the status of flag F3. Flag F3 is set when an interrupt is caused by the pulse sent from the sensor control circuit 1 as described later. If flag F3 is set, then step n3 is taken to reset flag F3 and call a level data renewal subroutine at step n4. This level data renewal subroutine is for obtaining the average level data Ha for Address A2 and updating the data at Addresses A3-A9 and the sensing error counter at Address A16. Then, by a reaping level control subroutine indicated at step n5, the drive pulse duty ratio is determined for the electromagnetic valve to vertically control the position of the reaper on the basis of the average level data obtained by the level renewal subroutine at step n4. Step n6 is for determining the value given by the sensing error counter. An alarm is given of sensor malfunction at step n7 when the counter value shows an overflow, i.e. when the measured level data exceeding a certain value continues sixteen times in succession. Unless the sensing error counter is in the overflow state, a jump is taken from step n6 to step n8. When the time for the standard cycle runs out, the flow returns from step n8 to step n2 to check on the status of flag F3 again. In this way level data renewals, reaping level controls and sensing error counter checking are carried out by each standard cycle.

In the above main routine a move from step n2 to step n3 is made when an interrupt is caused by the sensor control circuit 1 as described. There are three types of interrupt, namely the interrupt from the sensor control circuit 1, a cycle time interrupt and an interrupt from the dynamo. FIG. 4(B) shows an interrupt routine executed when an interrupt occurs.

When an interrupt is caused by the sensor control circuit 1, the dynamo, or an internal timer, the various registers are first saved at step n10. If the interrupt is a cycle time interrupt, the flow moves from step n11 to step n12, and otherwise from step n11 to step n13. At step n13 checking is made of the signal status at the port R11 of the CPU 7. If there is a trail in the output of the sensor control circuit 1, it means that the interrupt occurred at the beginning of the pulse received and therefore internal timer data for measuring the level data is initialized at step n14 and the timer is started at step n15. If on the other hand the interrupt occurred at a rise of the sensor control circuit output, the flow moves from step n13 to step n17 and to step n18 to stop the internal timer started at step n15 and, subsequently flag F13 is set at step n19. At step n20 the registers are restored and the flow returns to the main routine. By the above operation the internal timer stores a pulse length of the received signal proportional to a reaper level. In other words, the internal timer data correspond to measured levels in ordinary situations. The internal timer data show an overflow in the case that no reception signal occurs within the predetermined time (6 miliseconds). This overflow status is checked by the data renewal subroutine described later and its data is discarded as invalid when in the overflow status. If the interrupt is caused by the engine dynamo, the flow moves from step n17 to n21 where the revolutions of the engine are counted. When the revolutions of the engine are counted, the port R11 may receive a trail or rise of the output of the sensor control circuit 1. In this case the data invalidating flag F2 is set at step n24 as otherwise an error would occur in the next level measurement data. The current level measurement data are discarded as invalid as described later because flag F2 is set.

When flag F3 is set at step n19 as described above, the flow in the main routine moves from step n2 to step n3 and to step n4 and the level data renewal subroutine is executed.

FIG. 4(C) shows a flowchart for the level data renewal subroutine. First the status of data invalidating flag F2 is determined at step n30. As already described, the data invalidating flag F2 is set at step n24 if the sensor control circuit output rises or trails simultaneously with the counting of the engine revolutions. In this case, a jump is taken from step n30 to step 39 followed by a return to the main routine without executing this subroutine. In other words, the level data are not renewed. When the data invalidating flag F2 is not set, the flow moves to step n31 to determine whether the internal timer is overflowing or not. The internal timer comprises 8 bits, and its clock pulse length is set to a maximum measurement of 1,044 millimeters. Therefore, the internal timer overflows when a measurement data exceeds 1,044 millimeters. This situation arises when no reception signal takes place within 6 milliseconds after a signal transmission. In this case the flow jumps to step n39 to increment the sensing error counter and return to the main routine. When the internal timer is not overflowing, the flow moves to step n32 at which stage the internal timer data, i.e. level measurement data, is stored as Hn in Address A3. At step n35 an average level data Ha is derived from an average level data Ha obtained the previous time and seven average level data Hn to Hn-6 obtained earlier.

After storing the average level data Ha in Address A2 at step n35, the data in Addresses A4 to A9 are renewed at step n36 to be older by one, respectively. Furthermore, since the measurement data exceed the certain value, the sensing error counter is decremented at step n37 and the flow returns to the main routine. Thus the level data renewal subroutine obtains the average level data Ha which serves as reference data for a subsequent reaping level control.

The reaping level control subroutine is executed after the level data renewal subroutine is executed at step n4 of the main routine. FIG. 4(D) is a flowchart for the reaping level control subroutine.

First, at step n40 a position setting data for the reaping level fine adjustor VR is stored as ΔH in Address A10. The ΔH data is added to the target level data preset in Address A11, the sum being subtracted from the average level data obtained by the reaping level data renewal subroutine. The resulting difference is stored as a deviation in Address A12. If the deviation is positive the reaper lowering flag F1 is set, and if the deviation is negative the reaper raising flag F0 is set (steps n43 and n44). Thereafter, at step n45, an actual transmission time or duty ratio of the electromagnetic valve drive pulse is determined on the basis of the deviation obtained at step n41 and according to the table of FIG. 3. Step n46 determines whether or not the deviation is within an insensitivity range, i.e. within 0–20.4 millimeters. If it is within the insensitivity range, the electromagnetic valve is turned off at step n56 and the flow returns to the main routine. Where the deviation is beyond the insensitivity range, the deviation is determined at step n47, i.e., whether the deviation is greater or smaller than the reference level data H1 stored in Address A14. This reference level data H1 is set to 261 millimeters. As shown in the table of FIG. 3, the electromagnetic valve is driven continuously when the deviation exceeds 261 millimeters and is driven intermittently by an intermittent pulse when the deviation is less than 261 millimeters. Therefore, when step n44 finds the deviation greater than the reference level data H1, flags F0 and F1 are checked at steps n48 and n49. If flag F0 is set then the reaper is raised continuously, and if flag F1 is set the reaper is lowered continuously. When the deviation is less than the reference level data H1, flag F0 and F1 are checked at steps n52 and n53. If flag F0 is set then the reaper is raised intermittently (n54), and if flag F1 is set the reaper is lowered intermittently (n55). The drive pulse duty ratio for intermittently driving the reaper at this time is determined by the length of actual transmission time corresponding to the deviation as shown in the table of FIG. 3. Thus, the reaper is continuously raised or lowered when the deviation is greater than the reference level data H1. If the deviation reduces below the reference level data H1 at a next sampling time, the reaper is intermittently lowered or raised in accordance with an amount of the deviation. The reaper is brought toward the target level by an appropriate drive pulse ratio according to the amount of deviation obtained at each subsequent sampling. It is to be noted that, when flag F2 is set at step n24 or when the internal timer is stopped by step n18 and is overflowing, then the level data renewal subroutine is not executed and therefore there occurs no vertical movement of the reaper.

According to the foregoing operation, when the measured level data exceed 1,044 millimeters, that is when the internal timer overflows, the data are treated as invalid and the sensing error counter is incremented. If the measured level data do not exceed 1,044 millimeters, the data are treated as valid and the sensing error counter is decremented. An alarm of sensor malfunction is given only when the counter value reaches 16, that is to say when invalid data repeat sixteen times in succession.

In this way an average is worked out on the basis of proper measurement data with wrong data having automatically been excluded. When the measured levels are close to the target level, a short drive pulse is given to delay the response of vertical reaper movement in order to realize stability. When the measured levels are remote from the target level, a continuous pulse is given to quicken the response of vertical reaper movement thereby bringing the reaper toward the target level with precision and speed.

I claim:

1. An apparatus for controlling a height of a reaper of a combine, comprising:

a noncontact distance sensor operated in a fixed cycle to measure the height of a reaper, comparison means to compare the height measurement data provided by said sensor with a predetermined target value and to determine the height measurement data to be invalid data when the height measurement data exceeds the predetermined target value and to be valid data when the height measurement data is below the predetermined value, counter means to count a number of invalid data recognized by said comparison means continuously, said counter means being incremented upon recognition of the invalid data and decremented upon recognition of the valid data, alarm means connected to said counter means for providing an alarm upon said counter means exceeding a predetermined count, memory means to store a predetermined number of said valid data sequentially, said memory means being arranged to replace the oldest valid data with the latest valid data upon said predetermined memory being exceeded, first means connected to said memory means for calculating an average of all the valid data stored therein, second means connected to said first means for determining differential amounts between said average and said predetermined target value, third means connected to said second means for generating a pulse signal having a duty ratio corresponding to said differential amounts, fourth means connected to said third means for classifying said differential amounts among a maximum range, an intermediate range, and a minimum range and for varying an ON timing of said pulse signal in response to such classification, and actuator means to vertically move said reaper in response to the ON timing of said pulse signal, whereby overshoot of the target value is minimized.

2. A method of controlling a height of a reaper of a combine with respect to a desired target height therefor, said method comprising the steps of:

(a) measuring the height of the reaper above ground in a fixed cycle, (b) disregarding a height measurement data as invalid and incrementing an invalid data counter when the height measurement data exceeds a predetermined permissible range, accepting the height measurement data as valid and decrementing the invalid data counter when the height measurement data is within the predetermined permissible range, said invalid data counter being further decremented to 0 upon measurement of a series of valid height measurement data, and providing a malfunction alarm while said invalid data counter exceeds a predetermined count, (c) storing the valid height measurement data in a measurement data memory area adapted to store a plurality of measurement data, the valid height measurement data replacing the oldest height measurement data when the measurement data memory area is full, (d) deriving an average of all the height measurement data stored in the measurement data memory area, (e) determining any differential amounts between a predetermined target height and said average, and a direction of the differential amounts, up or down, and selecting a maximum range, a minimum range and an intermediate range of said differential amounts to control an ON time of a pulse signal, (f) generating a train of pulses having a duty ratio corresponding to said differential amounts and the direction thereof to form said pulse signal, and providing said pulse signal an ON time of 0 ms when said differential time amounts are in a maximum range, a continuous ON time when said differential amounts are in a minimum range, and varied ON times corresponding to varying differential amounts classified stepwise in an intermediate range, (g) supplying said pulse signal to an actuator adapted for vertically moving the reaper, and continuously repeating the steps (a) through (g), whereby the height of the reaper follows the desired target height.

* * * * *